United States Patent
Fukuta

(10) Patent No.: US 11,040,656 B2
(45) Date of Patent: Jun. 22, 2021

(54) ALERT APPARATUS FOR VEHICLE

(71) Applicant: TOYOTA JIDOSHA KABUSHIKI KAISHA, Toyota (JP)

(72) Inventor: Junya Fukuta, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/520,993

(22) Filed: Jul. 24, 2019

(65) Prior Publication Data

US 2020/0108770 A1 Apr. 9, 2020

(30) Foreign Application Priority Data

Oct. 9, 2018 (JP) .............................. JP2018-190668

(51) Int. Cl.
*B60Q 9/00* (2006.01)
*B60R 16/03* (2006.01)

(52) U.S. Cl.
CPC ............... *B60Q 9/00* (2013.01); *B60R 16/03* (2013.01)

(58) Field of Classification Search
CPC ............. B60Q 9/00; B60Q 9/001; B60Q 1/00
USPC ....................................................... 340/435
See application file for complete search history.

(56) References Cited

U.S. PATENT DOCUMENTS

| 7,653,486 B2* | 1/2010 | Takahashi ............... B60R 11/04 701/301 |
| 9,845,048 B1* | 12/2017 | Tseng ..................... G08G 1/167 |
| 10,060,170 B2* | 8/2018 | Gomez Melchor .... B60J 5/0493 |
| 2014/0098230 A1* | 4/2014 | Baur ................... B60R 16/0232 348/148 |
| 2017/0144597 A1* | 5/2017 | Wu ........................ B60Q 9/008 |
| 2017/0218678 A1* | 8/2017 | Kothari .................. B60Q 1/323 |
| 2018/0086268 A1 | 3/2018 | Kochiya |
| 2018/0238098 A1* | 8/2018 | Rhode ..................... E05F 15/73 |

FOREIGN PATENT DOCUMENTS

| JP | 2011-111070 A | 6/2011 |
| JP | 2013-018321 A | 1/2013 |
| JP | 2014-085869 A | 5/2014 |
| JP | 2016-082417 A | 5/2016 |
| JP | 2018-008576 A | 1/2018 |
| JP | 2018-039471 A | 3/2018 |
| JP | 2018-047833 A | 3/2018 |

* cited by examiner

*Primary Examiner* — Emily C Terrell
(74) *Attorney, Agent, or Firm* — Sughrue Mion, PLLC

(57) ABSTRACT

Provided is an alert apparatus for a vehicle configured to: in a case where a connection state of a switch is an off state, determine whether or not there is an alert-target object based on vehicle peripheral information which has been acquired until an off time point at which the connection state of the switch is changed to the off state, the alert-target object being a moving object to be alerted when an occupant of the vehicle gets out of the vehicle; and configured to, when determining that there is the alert-target object, cause an alerting device to perform an alerting operation.

5 Claims, 11 Drawing Sheets

ALERT APPARATUS FOR VEHICLE

CLAIM OF PRIORITY

The present application claims priority from Japanese patent application JP 2018-190668 filed on Oct. 9, 2018, the content of which is hereby incorporated by reference into this application.

BACKGROUND

1. Technical Field

The present disclosure relates to an alert apparatus for a vehicle configured to perform an operation/processing for alerting/notifying an occupant which is about to get out of the vehicle that a moving object is approaching the vehicle.

2. Description of the Related Art

Hitherto, there has been proposed an alert apparatus configured to detect a moving object approaching a vehicle by using a vehicle peripheral sensor (for example, a radar sensor, a camera, and the like) when there is a high possibility that an occupant is about to get out of the vehicle, and configured to notify (alert) the occupant that such a moving object is present (see Japanese Patent Application Laid-open No. 2011-111070).

In one related-art vehicle, a vehicle peripheral sensor is connected to a power supply device via an ignition switch. In this configuration, in a case where the ignition switch is in an off state, electric power is not supplied from the power supply device to the vehicle peripheral sensor. Therefore, the vehicle peripheral sensor cannot detect a moving object which is present in surroundings of the vehicle.

There is a problem that the related-art vehicle cannot notify an occupant that a moving object is approaching the vehicle when the ignition switch is in the off state.

SUMMARY

The present disclosure provides an alert apparatus configured to, even when the ignition switch is in the off state, notify an occupant which is about to get out of the vehicle that a moving object to be noted is present.

An alert apparatus according to one embodiment (hereinafter sometimes referred to as "apparatus of one embodiment") includes: a power supply device (60) mounted in the vehicle; a switch (80), a connection state of the switch being changed from an off state to an on state when a driver of the vehicle drives the vehicle, and being changed from the on state to the off state when the driver stops driving the vehicle; an information acquisition device (11, 12, 13) connected to the power supply device via the switch and configured to be connected to the power supply device to be supplied with electric power from the power supply device when the connection state of the switch is the on state, the information acquisition device being further configured to acquire vehicle peripheral information including information on a moving object which is present at least behind the vehicle through use of the supplied electric power; an alerting device (15, 16, 17) configured to be supplied with the electric power from the power supply device regardless of whether the connection state of the switch is the on state or the off state, the alerting device being further configured to perform an alerting operation for alerting an occupant of the vehicle through use of the supplied electric power; and a controller (50) configured to be supplied with the electric power from the power supply device regardless of whether the connection state of the switch is the on state or the off state.

Further, the controller is programmed to: in a case where the connection state of the switch is the off state, through use of the supplied electric power, determine whether or not there is an alert-target object based on the vehicle peripheral information which has been acquired until an off time point at which the connection state of the switch is changed from the on state to the off state (Step 340, Step 345, Step 520), the alert-target object being a moving object to be alerted when the occupant gets out of the vehicle; and when determining that there is the alert-target object, cause the alerting device to perform the alerting operation (Step 530).

As described above, the alert device and the controller can receive the electric power from the power supply device regardless of whether the connection state of the switch is the on state or the off state. Therefore, the alert device and the controller are configured to be operable regardless of whether the connection state of the switch is the on state or the off state. On the other hand, the information acquisition device is connected to the power supply device via the switch. Thus, the information acquisition device cannot acquire the vehicle peripheral information in real time on and after the connection state of the switch is changed from the on state to the off state. In view of this, the controller in the apparatus of one embodiment determines whether or not there is an alert-target object which is a moving object to be noted when the occupant gets out of the vehicle, based on the vehicle peripheral information which has been obtained until the time point at which the switch is changed to the off state. When determining that there is the alert-target object, the controller causes the alert device to perform the alerting operation. According to this configuration, the apparatus of one embodiment can notify the occupant which is about to get out of the vehicle that a moving object to be noted is present even when the switch is in the off state.

In one aspect of the apparatus of one embodiment, the controller is programmed to: in a case where the connection state of the switch is the on state, determine whether or not there is the alert-target object based on the vehicle peripheral information which has been acquired until at a time point at which that determination is made (Step 315, Step 320, Step 420); and, when determining that there is the alert-target object, cause the alerting device to perform the alerting operation (Step 430, Step 440).

Further, the controller is further programmed to: calculate a predicted time (Tk) until the moving object reaches a predetermined area (As) defined on the basis of the vehicle or a relative distance between the moving object and the predetermined area; and determine whether or not there is the alert-target object based on the predicted time or the relative distance.

The apparatus according to this aspect can determine whether or not the alert-target object is present based on the predicted time (Tk) until the moving object reaches the predetermined area (As) or the relative distance between the moving object and the predetermined area.

In one aspect of the apparatus of one embodiment, the controller is further programmed to: determine that there is the alert-target object when the connection state of the switch is the on state and the predicted time is equal to or shorter than a predetermined first time threshold (T1) (Step 420:Yes); and determine that there is the alert-target object when the connection state of the switch is the off state and the predicted time is equal to or shorter than a predetermined second time threshold (T2) (Step 520:Yes), the predetermined second time threshold being longer than the predetermined first time threshold.

For example, it is assumed that an occupant on a front passenger seat (or a rear seat) gets out of the vehicle in a situation in which the vehicle is temporarily stopped (that is, the vehicle is stopped with the switch being in the on state). In such a situation; the occupant often gets out of and leaves the vehicle within a relatively short time from a time point at which the vehicle is stopped. If the alerting operation is performed despite the fact that the predicted time is long, the occupant may feel annoyance. Therefore, the controller according to this aspect is programmed to determine that there is the alert-target object when the moving object is expected to reach the predetermined area within a relatively short time (the predicted time is equal to or shorter than the first time threshold).

On the other hand, when the switch is changed from the on state to the off state, it is considered that the vehicle is parked. In such a situation, it often takes a long time for the occupant to complete getting out of the vehicle after the vehicle is parked. Therefore, even in a situation in which the predicted time is long, the controller may consider a moving object as the alert-target to thereby perform the alerting operation. In the case where the switch is in the off state, the controller according to this aspect is programmed to determine that there is the alert-target object even when a moving object is expected to reach the predetermined area within a relatively long time (the predicted time is equal to or shorter than the second time threshold). According to this aspect, in the case where the switch is changed from the on state to the off state, the safety of the occupant getting out of the vehicle can be ensured/enhanced.

In one aspect of the apparatus of one embodiment, the controller is programmed to determine that there is the alert-target object when the connection state of the switch is the on state and the relative distance is equal to or shorter than a predetermined first distance threshold (D1); and determine that there is the alert-target object when the connection state of the switch is the off state and the relative distance is equal to or shorter than a predetermined second distance threshold (D2), the predetermined second distance threshold being longer than the predetermined first distance threshold.

As described above, it is assumed that the occupant on the front passenger seat (or the rear seat) gets out of the vehicle in the situation in which the vehicle is temporarily stopped. When the relative distance is long, it is considered that it takes a long time for the moving object to reach the predetermined area. If the alerting operation is performed despite the fact that the relative distance is long, the occupant may feel annoyance. Therefore, in the case where the switch is in the on state, the controller according to this aspect is programmed to determine that there is the alert-target object when the relative distance is relatively short (the relative distance is equal to or shorter than the first distance threshold D1).

On the other hand, it is assumed that the switch is changed from the on state to the off state to thereby park the vehicle. In such a situation, it often takes a long time for the occupant to complete getting out of the vehicle after the vehicle is parked. Therefore, even in a situation in which the relative distance is long, the controller may consider a moving object as the alert-target to thereby perform the alerting operation. Therefore, in the case where the switch is in the off state, the controller according to this aspect is programmed to determine that there is the alert-target object even when the relative distance is relatively long (the relative distance is equal to or shorter than the second distance threshold D2 (D2>D1)).

In one aspect of the apparatus of one embodiment, the controller is further programmed to: when determining that there is the alert-target object in the case where the connection state of the switch is the on state, cause the alert device to perform a first alerting operation as the alerting operation (Step 430, Step 440, Step 1110); and, when determining that there is the alert-target object in the case where the connection state of the switch is the off state, cause the alert device to perform a second alerting operation as the alerting operation (Step 530), the second alerting operation having an ability to alert the occupant which is lower than an ability to alert the occupant in the first alerting operation.

As described above, in the case where the switch is changed from the on state to the off state, even in a situation in which the predicted time (or the relative distance) is relatively long, the alerting operation is performed. However, after the switch is changed to the off state, the moving object (alert-target object) may change its moving direction, and thus, the moving object may not approach the vehicle. That is, in the case where the switch is in the off state and the predicted time (or the relative distance) is relatively long, the moving object may not reach the predetermined area. In such a situation, if the alerting operation with high "ability to alert the occupant" is performed, the occupant may feel annoyance. According to this aspect, the "ability to alert the occupant (ability to call attention of the occupant)" in the second alerting operation is lower than that in the first alerting operation. Therefore, in the case where the switch is in the off state, it is possible to reduce the possibility that the occupant feels annoyance.

According to one or more embodiments, the controller may be implemented by a microprocessor programmed for performing one or more operations and/or functionality described herein. According to one or more embodiments, the controller may be implemented, in whole or in part, by specifically configured to hardware (e.g., by one or more application specific integrated circuits or ASIC(s)).

In the above description, in order to facilitate understanding of the present disclosure, a name and/or reference numeral used in the embodiments of the present disclosure described later is enclosed in parentheses and assigned to each of the constituent features corresponding to the embodiments. However, each of the constituent features is not limited to the embodiments defined by the name and/or reference numeral.

DESCRIPTION OF THE EMBODIMENTS

<Configuration>

Figure 1:
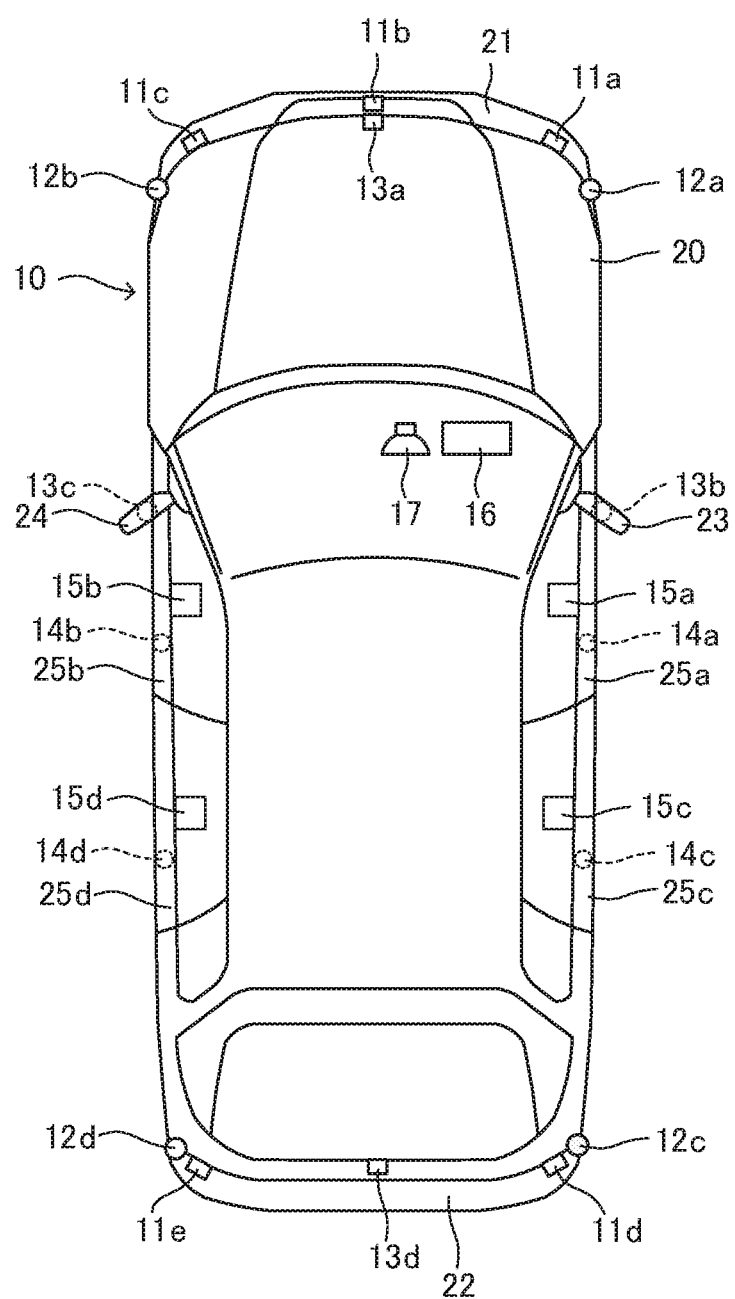
FIG. 1 is a diagram for illustrating a vehicle to which an alert apparatus according to an embodiment is applied.

Now, referring to the accompanying drawings, a description is given of an alert apparatus (warning apparatus) for a vehicle according to an embodiment of the present disclosure. The alert apparatus is applied to a vehicle as illustrated in FIG. 1. The vehicle 10 includes a plurality of radar sensors 11a to 11 e, a plurality of ultrasonic sensors 12a to 12d, a plurality of camera sensors 13a to 13d, a plurality of door switches 14a to 14d, a plurality of lamps 15a to 15d, a display device 16, and a buzzer (alert sound generation device) 17.

The plurality of radar sensors 11a to 11 e are collectively referred to as "radar sensors 11". The plurality of ultrasonic sensors 12a to 12d are collectively referred to as "ultrasonic sensors 12". The plurality of camera sensors 13a to 13d are collectively referred to as "camera sensors 13". The plurality of door switches 14a to 14d are collectively referred to as "door switches 14", The plurality of lamps 15a to 15d are collectively referred to as "lamps 15".

Each of the radar sensors 11 includes a radar transceiver (radar transmitting/receiving part) (not shown) and a signal controller (not shown). The radar transceiver radiates a radio wave in a millimeter waveband (hereinafter referred to as a "millimeter wave"), and receives a millimeter wave (that is, reflected wave) reflected by an object present within a radiation range. The signal controller acquires object information based on, for example, a phase difference between the transmitted millimeter wave and the received reflected wave, an attenuation level of the reflected wave, a time period from transmission of the millimeter wave to reception of the reflected wave, and the like. The object information includes, for example, a distance between the vehicle 10 and the object, a relative speed of the object with respect to the vehicle 10, and a relative position (direction) of the object with respect to the vehicle 10. In this embodiment, the object includes, for example, a moving object such as a pedestrian, a bicycle, a vehicle and the like, and a motionless object such as a guardrail, a fence and the like.

The radar sensor 11a is arranged at a corner position on the right side at a front portion of a vehicle body 20, and mainly acquires object information on an object present in a right front region with respect to the vehicle 10. The radar sensor 11b is arranged at a central position at the front portion of the vehicle body 20, and mainly acquires object information on an object present in a front region of the vehicle 10. The radar sensor 11c is arranged at a corner position on the left side at the front portion of the vehicle body 20, and mainly acquires object information on an object present in a left front region with respect to the vehicle 10. The radar sensor 11d is arranged at a corner position on the right side at a rear portion of the vehicle body 20, and mainly acquires object information on an object present in a right rear region with respect to the vehicle 10. The radar sensor 11e is arranged at a corner position on the left side at the rear portion of the vehicle body 20, and mainly acquires object information on an object present in a left rear region with respect to the vehicle 10.

Each of the ultrasonic sensors 12 transmits ultrasonic waves in a pulsed manner in a predetermined range, and receives reflected waves that have been reflected by an object. Each of the ultrasonic sensors 12 can detect/acquire a distance (reflection point distance) between the ultrasonic sensor 12 and a "reflection point, which is a point on the object from which the transmitted ultrasonic waves have been reflected" based on the time from transmission of the ultrasonic waves to reception thereof.

The ultrasonic sensor 12a is arranged at a position on the right side at the front portion of the vehicle body 20 (e.g., a right end portion of a front bumper 21), and acquires the reflection point distance of an object present on the right side with respect to the front portion of the vehicle 10. The ultrasonic sensor 12b is arranged at a position on the left side at the front portion of the vehicle body 20 (e.g., a left end portion of the front bumper 21), and acquires the reflection point distance of an object present on the left side with respect to the front portion of the vehicle 10. The ultrasonic sensor 12c is arranged at a position on the right side at the rear portion of the vehicle body 20 (e.g., a right end portion of a rear bumper 22), and acquires the reflection point distance of an object present on the right side with respect to the rear portion of the vehicle 10. The ultrasonic sensor 12d is arranged at a position on the left side at the rear portion of the vehicle body 20 (e.g., a left end portion of the rear bumper 22), and acquires the reflection point distance of an object present on the left side in the rear portion of the vehicle 10.

Each of the camera sensors 13 is, for example, a digital camera including an image pickup element of a charge coupled device (CCD) or a CMOS image sensor (CIS). Each of the camera sensors 13 acquires image data on a peripheral state (including objects, separation lines of a road, and the like) of the vehicle at a predetermined frame rate (i.e., every time a predetermined time elapses).

The camera sensor 13a is arranged at a substantially central portion of the front bumper 21 in the vehicle width direction, and acquires image data in front of the vehicle 10. The camera sensor 13b is arranged at a right-side door mirror 23, and acquires image data on the right side and the right rear side of the vehicle 10. The camera sensor 13c is arranged at a left-side door mirror 24, and acquires image data on the left side and the left rear side of the vehicle 10. The camera sensor 13d is arranged at a wall portion of a rear trunk at the rear portion of the vehicle body 20, and acquires image data behind the vehicle 10.

The "radar sensors 11, ultrasonic sensors 12, and camera sensors 13" are collectively referred to as "vehicle peripheral sensor (or information acquisition device)". The vehicle 10 does not necessarily include all of the radar sensors 11, the ultrasonic sensors 12 and the camera sensors 13 as the vehicle peripheral sensor, but may include at least one of the radar sensors 11, the ultrasonic sensors 12 and the camera sensors 13.

The door switches 14a to 14d are arranged at doors 25a to 25d, respectively. Each of the door switches 14 is configured to output an on signal (high-level signal) when the corresponding door (25a, 25b, 25c or 25d) is opened, and output an off signal (low-level signal) when that corresponding door is closed. A state (e.g., half-open door/ajar door) other than the state in which the door is properly closed refers to the "state in which the door is opened".

The lamps 15a to 15d are arranged at inner-side portions of the doors 25a to 25d, respectively. An occupant of the vehicle 10 can visually recognize the lamps 15a to 15d when the occupant gets out of the vehicle 10.

The display device 16 is, for example, a multi-information display mounted in front of a driver's seat. The display device 16 displays various types of information (a warning screen and an alert screen described later) in addition to values measured by meters, for example, a vehicle speed, an engine rotation speed and the like. A head-up display may be employed as the display device 16.

The buzzer 17 is provided near the driver's seat, and is configured to produce a warning sound for the occupant. The "lamps 15, display device 16 and buzzer 17" are collectively referred to as "alert device (or notifying device)".

Figure 2:
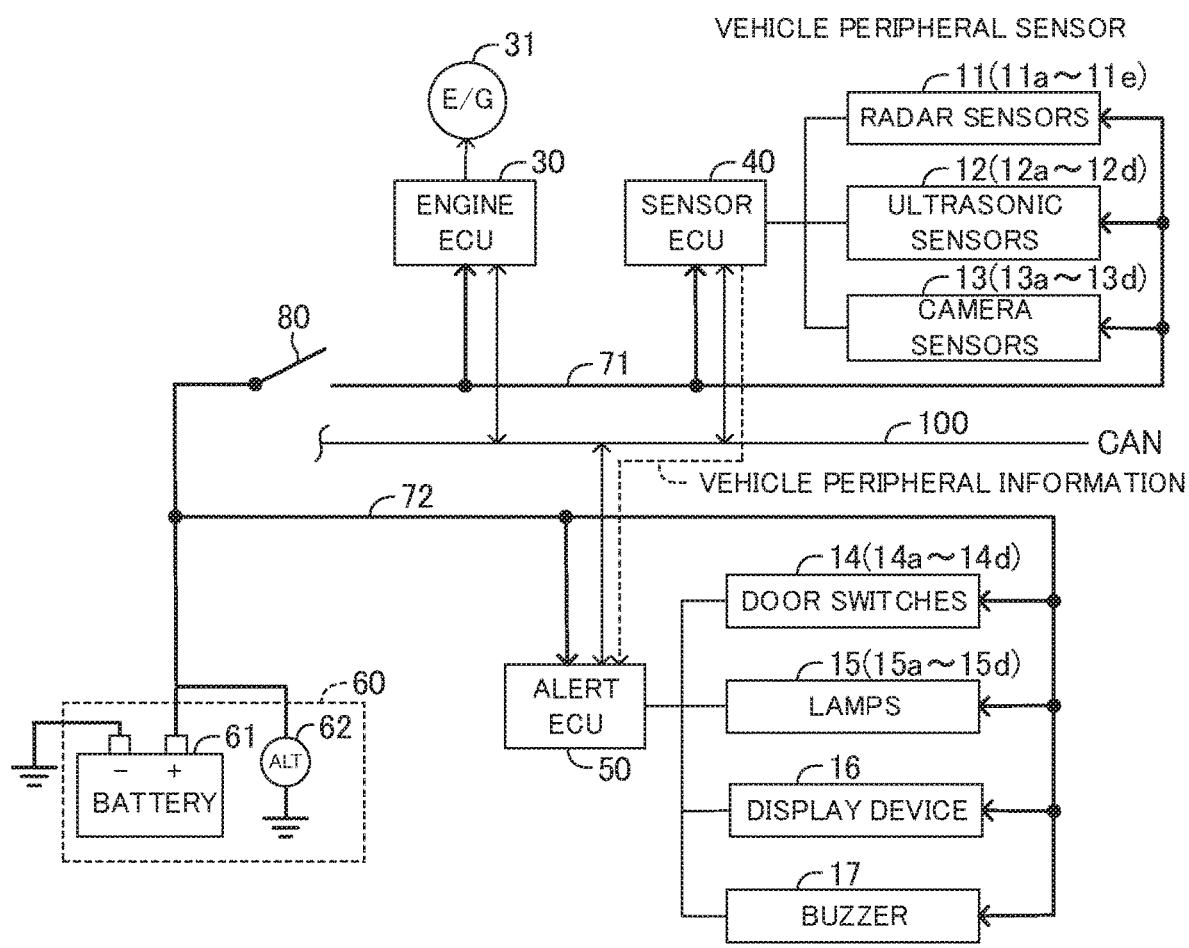
FIG. 2 is a diagram for illustrating a schematic configuration of the alert apparatus according to the embodiment.

As illustrated in FIG. 2, the alert apparatus according to this embodiment further includes an engine ECU 30, a sensor ECU 40, and an alert ECU 50.

Those ECUs are electric control units each including a microcomputer as a main part, and are connected to one another so as to be able to mutually transmit and receive information via a controller area network (CAN) 100. The microcomputer herein includes a CPU, a RAM, a ROM, a non-volatile memory, an interface I/F, and the like. The CPU executes instructions (programs and routines) stored in the ROM to realize various functions.

The engine ECU 30 is capable of changing a torque to be generated by an engine 31 by driving an engine actuator (not shown). Thus, the engine ECU 30 is capable of controlling a driving force of the vehicle 10 by controlling the engine actuator. When the vehicle 10 is a hybrid vehicle, the engine ECU 30 is capable of controlling a driving force of the vehicle to be generated by any one of or both of "an internal combustion engine and a motor" serving as vehicle driving sources. Further, when the vehicle 10 is an electric vehicle, the engine ECU 30 is capable of controlling a driving force of the vehicle to be generated by a motor serving as a vehicle driving source.

The sensor ECU 40 is connected to the radar sensors 11, the ultrasonic sensors 12, and the camera sensors 13. The sensor ECU 40 receives signals containing information acquired by each of the radar sensors 11 and the ultrasonic sensors 12 every time a predetermined first period elapses. The sensor ECU 40 detects an object present in surroundings of the vehicle 10 based on the information (i.e., the object information, the reflection point distance, and the like) which is contained in the received signals. Then, the sensor ECU 40 calculates parameters representing a relative relationship between the vehicle and the object. The "parameters representing the relative relationship between the vehicle and the object" include an azimuth direction (or position) of the object with respect to the vehicle 10, a distance between the vehicle 10 and the object, a relative speed of the object with respect to the vehicle 10, and the like.

Further, the sensor ECU 40 acquires the image data from each of the camera sensors 13 every time the first period elapses. The sensor ECU 40 analyzes the image data to detect an object present in surroundings of the vehicle 10, and calculates the parameters representing the relative relationship between the vehicle and the object.

Hereinafter, the "parameters representing the relative relationship between the vehicle and the object" obtained based on the signals from the vehicle peripheral sensor (including the radar sensors 11, the ultrasonic sensors 12, and the camera sensors 13) is referred to as "vehicle peripheral information". Every time the first period elapses, the sensor ECU 40 transmits the vehicle peripheral information to the alert ECU 50 via the CAN 100.

The alert ECU 50 is also connected to the door switches 14, the lamps 15, the display device 16, and the buzzer 17. Every time the first period elapses, the alert ECU 50 receives the vehicle peripheral information from the sensor ECU 40 and stores the received vehicle peripheral information in the RAM. In order to determine whether or not a detected object is a moving object to be watched out for (to be paid attention to), the sensor ECU 40 stores a data set of the vehicle peripheral information obtained in a period having a length at least several times the first period.

The alert ECU 50 determines whether or not there is a moving object which is approaching the vehicle 10 from the rear of the vehicle 10 based on the vehicle peripheral information, and controls the lamps 15, the display device 16 and the buzzer 17. The details of a control method of the lamps 15, the display device 16 and the buzzer 17 will be described later.

Further, the alert ECU 50 is connected to sensors (not shown) configured to detect a driving state of the vehicle 10. For example, those sensors include a vehicle speed sensor, a steering angle sensor, an accelerator pedal operation amount sensor, a brake pedal operation amount sensor, and the like. The alert ECU 50 acquires parameters representing the driving state of the vehicle 10 detected by those sensors.

Furthermore, the alert apparatus according to this embodiment includes a power supply device 60. The power supply device 60 includes a battery 61 and an alternator 62 configured to generate electric power through rotation of the engine 31. The power supply device 60 supplies electric power to electrical loads in the vehicle 10. The electric power of the power supply device 60 is supplied to the electrical loads in the vehicle 10 via two power supply lines (including a first power supply line 71 and a second power supply line 72).

The first power supply line 71 extends from the power supply device 60 to the engine ECU 30, the sensor ECU 40, and the vehicle peripheral sensor via an ignition switch 80. That is, the power supply device 60 is electrically connected to the engine ECU 30, the sensor ECU 40, and the vehicle peripheral sensor, with the ignition switch 80 interposed therebetween. Hereinafter, the ignition switch 80 is referred to as "IG switch 80". A connection state of the IG switch 80 is changed in response to an operation on an engine start button (not shown). The engine start button is a button to be operated by the driver when he/she instructs start and stop of the engine 31.

The IG switch 80 becomes an on state (i.e., a connected state/closed state) when the driver presses the engine start button in a state in which the engine 31 is stopped. When the IG switch 80 is in the on state, voltage (power supply voltage) of the power supply device 60 is applied to the engine ECU 30, the sensor ECU 40, and the vehicle peripheral sensor. That is, when the IG switch 80 is in the on state, the electric power is supplied from the power supply device 60 to the engine ECU 30, the sensor ECU 40, and the vehicle peripheral sensor through the IG switch 80. The engine ECU 30, the sensor ECU 40 and the vehicle peripheral sensor operate with the supplied electric power. Therefore, when the IG switch 80 is in the on state, the vehicle peripheral sensor acquires information (containing the image data) on an object in surroundings of the vehicle 10, and the sensor ECU 40 acquires the vehicle peripheral information based on the signals from the vehicle peripheral sensor, and transmits the acquired vehicle peripheral information to the alert ECU 50.

On the other hand, when the driver presses the engine start button in a state in which the engine 31 is in operation, the IG switch 80 becomes an off state (i.e., a non connected state/open state). When the IG switch 80 is in the off state, the voltage of the power supply device 60 is not applied to the engine ECU 30, the sensor ECU 40, and the vehicle peripheral sensor. Therefore, the engine ECU 30 stops the operation of the engine 31. Furthermore, the operation of the vehicle peripheral sensor is stopped (the vehicle peripheral sensor is deactivated), and the sensor ECU 40 stops the transmission of the vehicle peripheral information to the alerting ECU 50.

The second power supply line 72 extends from the power supply device 60 directly to the door switches 14, the alert device (including the lamps 15, the display device 16 and the buzzer 17), and the alert ECU 50. That is, the power supply device 60 and "the door switches 14, the alert device and the alert ECU 50" are electrically connected without interposing the IG switch 80. Therefore, regardless of the state of the IG switch 80 (that is, regardless of whether the IG switch 80 is in the on state or the off state), the voltage of the power supply device 60 is applied to the door switches 14, the alert device, and the alert ECU 50. That is, even when the IG switch 80 is in the off state, the electric power of the power supply device 60 is supplied to the door switches 14, the alert device, and the alert ECU 50. In the above manner, the door switches 14, the alert device and the alert ECU 50 are configured to be operable regardless of whether the state of the IG switch 80 is the on state or the off state.

(Outline of Operation of Alert Apparatus)

As described above, in the related-art vehicle in which the vehicle peripheral sensor and the power supply device are connected via the ignition switch, when the ignition switch is in the off state, the vehicle peripheral sensor cannot detect a moving object present in surroundings of the vehicle (i.e., the vehicle peripheral sensor cannot acquire information on a moving object). Therefore, when the ignition switch is in the off state, the related-art vehicle cannot notify an occupant which is getting out of the vehicle that a moving object is approaching the vehicle.

For the above problem, the inventors in the present application reached to the following findings. Even when the IG switch 80 is in the off state, it is possible to use the vehicle peripheral information, which has been obtained until a time point at which the IG switch 80 is changed from the on state to the off state, to thereby predict/estimate whether or not a moving object will approach the vehicle 10 from behind the vehicle 10 on and after that time point at which the IG switch 80 is changed to the off state. Hereinafter, the "time point at which the IG switch 80 is changed from the on state to the off state" will be simply referred to as "off time point".

Therefore, the alert apparatus according to this embodiment is configured to, when the IG switch 80 is changed from the on state to the off state, determine whether or not there is an alert-target object which is a moving object to be alerted/noted when an occupant gets out of the vehicle, based on the vehicle peripheral information which has been obtained until the off time point. In this embodiment, the "alert-target object" refers to a moving object which is present behind the vehicle 10 and is approaching the vehicle 10. When the alert apparatus determines that there is an alert-target object, the alert apparatus causes the alert device (including the lamps 15, the display device 16 and the buzzer 17) to perform an alerting operation (Step 530) described later.

Meanwhile, when the IG switch 80 is in the on state, the alert apparatus determines whether or not there is an alert-target object based on the vehicle peripheral information which has been obtained until a time point at which that determination is made. When the alert apparatus determines that there is an alert-target object, the alert apparatus causes the alert device to perform an alerting operation (Step 430, or both of Steps 430 and 440) described later.

Further, the alert apparatus is configured to determine whether or not there is an alert-target object based on a "predicted time until a moving object reaches a predetermined area (See "As" in FIG. 6)". This area is defined/set on the basis of the vehicle. The predicted time may be referred to as TTC (Time to collision). Hereinafter, the "predicted time until a moving object reaches the predetermined area" will be referred to as "predicted time Tk". The predicted time Tk is calculated by dividing a distance between the predetermined region and a moving object by a speed (relative speed) of the moving object with respect to the vehicle.

In the case where the IG switch 80 is in the on state, when the predicted time Tk is equal to or shorter than a predetermined first time threshold T1, the alert apparatus determines that an alert-target object is present. On the other hand, in the case where the IG switch 80 is in the off state, when the predicted time Tk is equal to or shorter than a predetermined second threshold T2 which is longer than the first time threshold T1, the alert apparatus determines that an alert-target object is present. This is due to the following reasons.

For example, it is assumed that an occupant on a front passenger (or a rear seat) gets out of the vehicle 10 in a situation in which the vehicle 10 is temporarily stopped (that is, the vehicle 10 is stopped with the IG switch 80 being in the on state). In such a case, the occupant often gets out of and leaves the vehicle within a relatively short time from a time point at which the vehicle 10 is stopped. If the alerting operation is performed despite the fact that the predicted time Tk is long, the occupant may feel annoyed. Therefore, the alert apparatus is configured to perform the alerting operation when a moving object is expected to reach the predetermined area within a relatively short time (the predicted time Tk is equal to or shorter than the first time threshold T1).

On the other hand, when the IG switch 80 is changed from the on state to the off state, it is considered that the vehicle 10 is parked. In such a case, it often takes a long time for the occupant to complete getting out of the vehicle 10 after the vehicle 10 is parked. Therefore, the alert apparatus is configured to consider a moving object as the alert-target object even in a case in which the predicted time Tk is long (for example, the moving object is present at a position relatively far from the vehicle 10). In the case where the IG switch 80 is in the off state, the threshold (for the predicted time Tk)

for determining whether or not an alert-target object is present is set to a value which is longer than that in the case where the IG switch 80 is in the on state. Therefore, the alert apparatus performs the alerting operation even when a moving object is expected to reach the predetermined area within a relatively long time (that is, the predicted time Tk is equal to or shorter than a predetermined second time threshold T2). According to this configuration, the safety of the occupant getting out of the vehicle can be ensured/enhanced when the IG switch 80 is in the off state.

(Operation of Alert Apparatus)

A description is now given of an operation of the CPU of the alert ECU 50 (hereinafter simply referred to as "CPU") will be described. The CPU is configured to execute a "moving object determination routine" illustrated in FIG. 3 as a flowchart every time a "predetermined second period equal to or longer than the first period" elapses.

In addition, when the IG switch 80 is changed from the off state to the on state, the CPU executes an initialization routine (not shown) to set values of various flags, which are described later, to "0" (that is, the CPU resets the flags). Further, the CPU acquires the vehicle peripheral information from the sensor ECU 40 by executing a routine (not shown) every time the first period elapses. The CPU stores the vehicle peripheral information in the RAM together with information on the time at which the vehicle peripheral information is acquired.

Figure 3:
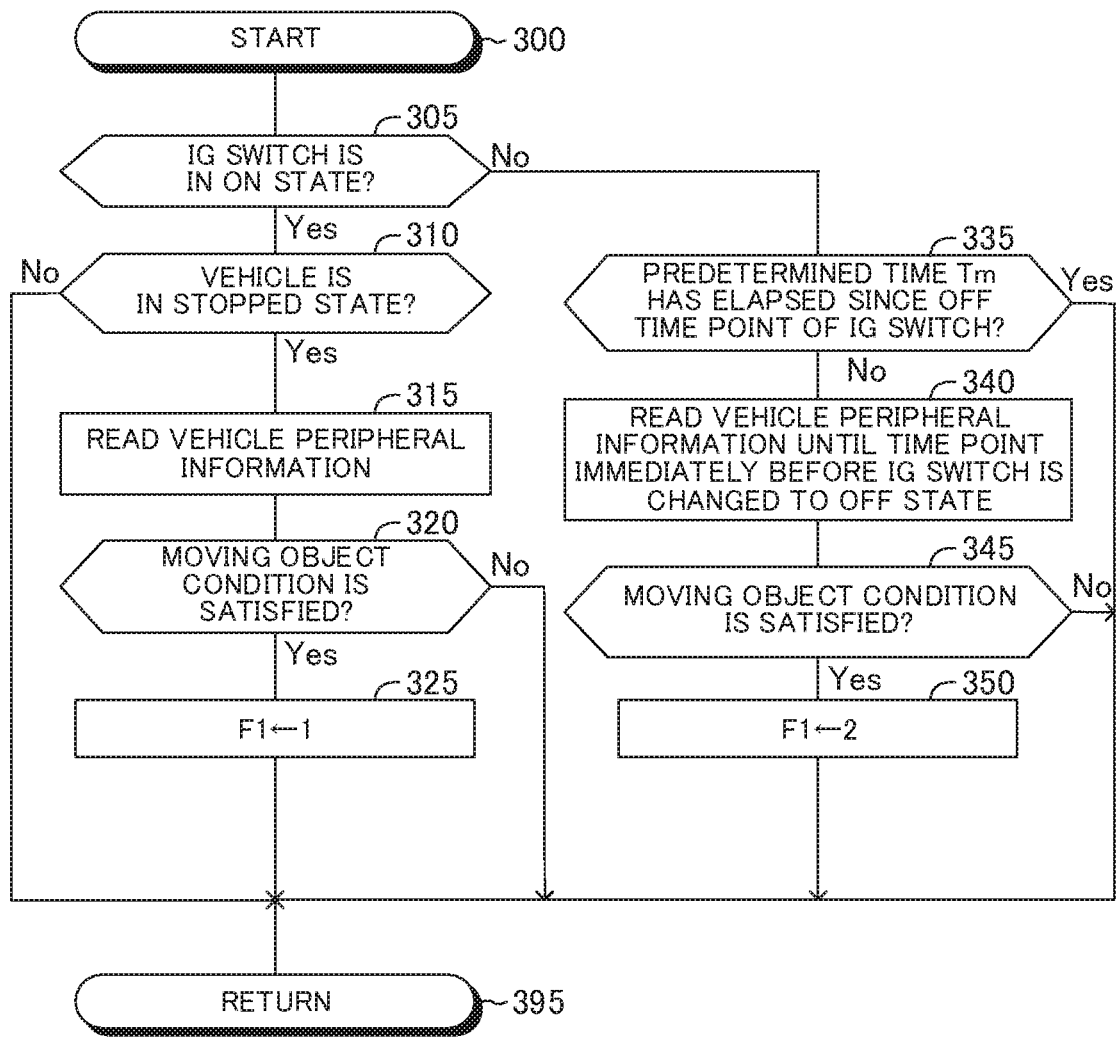
FIG. 3 is a flowchart for illustrating a "moving object determination routine" to be executed by a CPU of an alert ECU in the embodiment.

When a predetermined timing is reached, the CPU starts the processing from Step 300 of FIG. 3, and proceeds to Step 305 to determine whether or not the IG switch 80 is in the on state.

Assuming that the IG switch 80 is in the on state, the CPU makes a "Yes" determination in Step 305, and proceeds to Step 310. In Step 310, the CPU determines whether or not the vehicle 10 is in a stopped state (that is, whether the vehicle speed of vehicle 10 detected by the vehicle speed sensor is "0").

When the vehicle 10 is not in the stopped state, the CPU makes a "No" determination in Step 310, and proceeds directly to Step 395 to tentatively terminate this routine.

Meanwhile, when the vehicle 10 is in the stopped state, the CPU makes a "Yes" determination in Step 310, and proceeds to Step 315 to read the vehicle peripheral information from the RAM.

Next, in Step 320, the CPU determines whether or not a predetermined moving object condition is satisfied based on the vehicle peripheral information read in Step 315. The moving object condition is a condition for determining whether or not there is an object (moving object) which is approaching from the rear of the vehicle 10.

Figure 6:
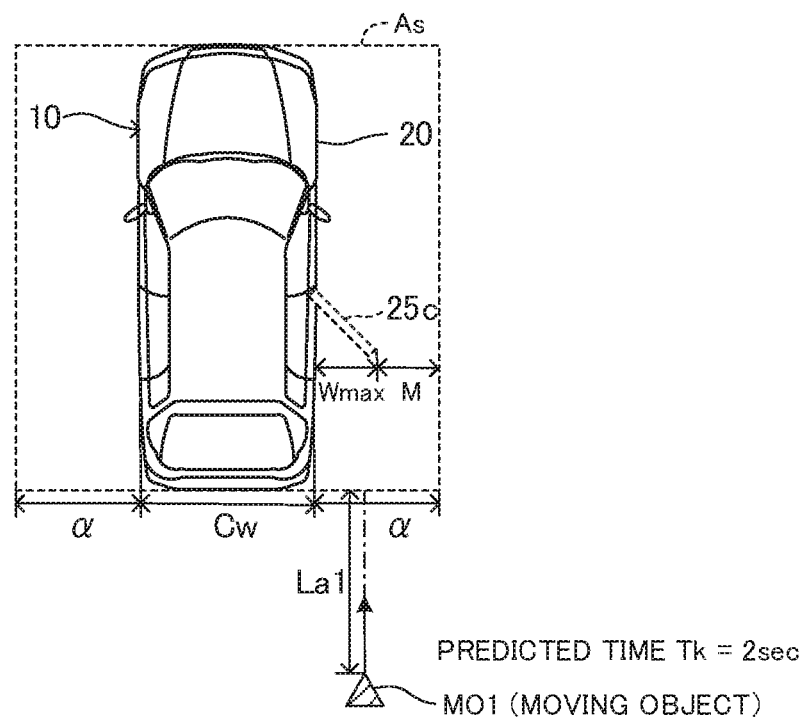
FIG. 6 is a plan view for illustrating a situation in which a moving object is approaching the vehicle from behind the vehicle in a case where an ignition switch is in an on state.

It is now assumed that there is a moving object MO1 which is approaching from the rear of the vehicle 10 as illustrated in FIG. 6. The CPU defines/sets a predetermined area As on the basis of the vehicle body 20 of the vehicle 10. The area As is an area in which a vehicle-width Cw is expanded to the left and right sides by a distance a with reference to an area occupied by the vehicle body 20 of the vehicle 10. For example, the distance a is the sum of the maximum opening width Wmax of the door (see, for example, the door 25c in FIG. 6) and a predetermined margin M. The predetermined area As is not limited to this example.

The moving object condition is satisfied when both of the following conditions 1 and 2 are satisfied.

(Condition 1): an extended line of a moving direction of the object intersects with the area As.

(Condition 2): a moving speed of the object is greater than a predetermined speed (a speed substantially closer to "0").

The CPU calculates the moving direction and moving speed of the object based on (i) a position of the object at a time point (hereinafter, referred to as "first time point") at which the CPU executes the processing of Step 320, and (ii) a position of the object at a time point (hereinafter, referred to as "second time point") the first period before the first time point. Then, the CPU determines whether or not the moving object condition is satisfied.

In the example illustrated in FIG. 6, the extended line (dashed-dotted line) of the moving direction of the moving object MO1 intersects with the area As, and the moving speed of the moving object MO1 is greater than the predetermined speed. Therefore, the moving object condition is satisfied. The CPU makes a "Yes" determination in Step 320, and proceeds to Step 325 to set a first flag F1 to "1". When the value of the first flag F1 is "1", this indicates that, in a situation in which the IG switch 80 is in the on state, a moving object (approaching from behind the vehicle 10) is present which may be considered as the alert-target object. When the value of the first flag F1 is "2", this indicates that, in a situation in which the IG switch 80 is in the off state, a moving object is present which may be considered as the alert-target object. The first flag F1 is set to "0" in Steps 445 and 460 in a routine of FIG. 4 described later, and Steps 535 and 550 in a routine of FIG. 5 described later. Thereafter, the CPU proceeds to Step 395 to tentatively terminate this routine.

When the moving object condition is not satisfied, the CPU makes a "No" determination in Step 320, and proceeds directly to Step 395 to tentatively terminate this routine.

On the other hand, when the IG switch 80 is in the off state at the time point at which the CPU executes the processing of Step 305, the CPU makes a "No" determination in Step 305, and proceeds to Step 335. In Step 335, the CPU determines whether or not a predetermined time Tm or more has elapsed since the off time point of the IG switch 80.

When the predetermined time Tm or more has elapsed since the off time point, the CPU makes a "Yes" determination in Step 335, and proceeds directly to Step 395 to tentatively terminate this routine.

It is now assumed that the current time point is a time point immediately after the off time point (that is, the predetermined time Tm has not elapsed since the off time point). The CPU makes a "No" determination in Step 335, and proceeds to Step 340 to read the vehicle peripheral information from the RAM. Since the IG switch 80 is in the off state at the current time point, the vehicle peripheral information until a time point immediately before the off time point has been stored in the RAM. Therefore, in Step 340, the CPU reads from the RAM the vehicle peripheral information which has been acquired/obtained until the time point immediately before the off time point.

Next, in Step 345, the CPU determines whether or not the moving object condition is satisfied based on the vehicle peripheral information read in Step 340. Specifically, the CPU calculates the moving direction and moving speed of the object based on (i) a position of the object at the time point (hereinafter, referred to as "third time point") immediately before the off time point, and (ii) a position of the object at a time point (hereinafter, referred to as "fourth time point") the first period before the third time point. Then, the CPU determines whether or not the moving object condition is satisfied as described above.

When the moving object condition is not satisfied, the CPU makes a "No" determination in Step 345, and proceeds directly to Step 395 to tentatively terminate this routine.

On the other hand, when the moving object condition is satisfied, the CPU makes a "Yes" determination in Step 345, and proceeds to Step 350 to set the value of the first flag F1 to "2". Thereafter, the CPU proceeds to Step 395 to tentatively terminate this routine.

Figure 4:
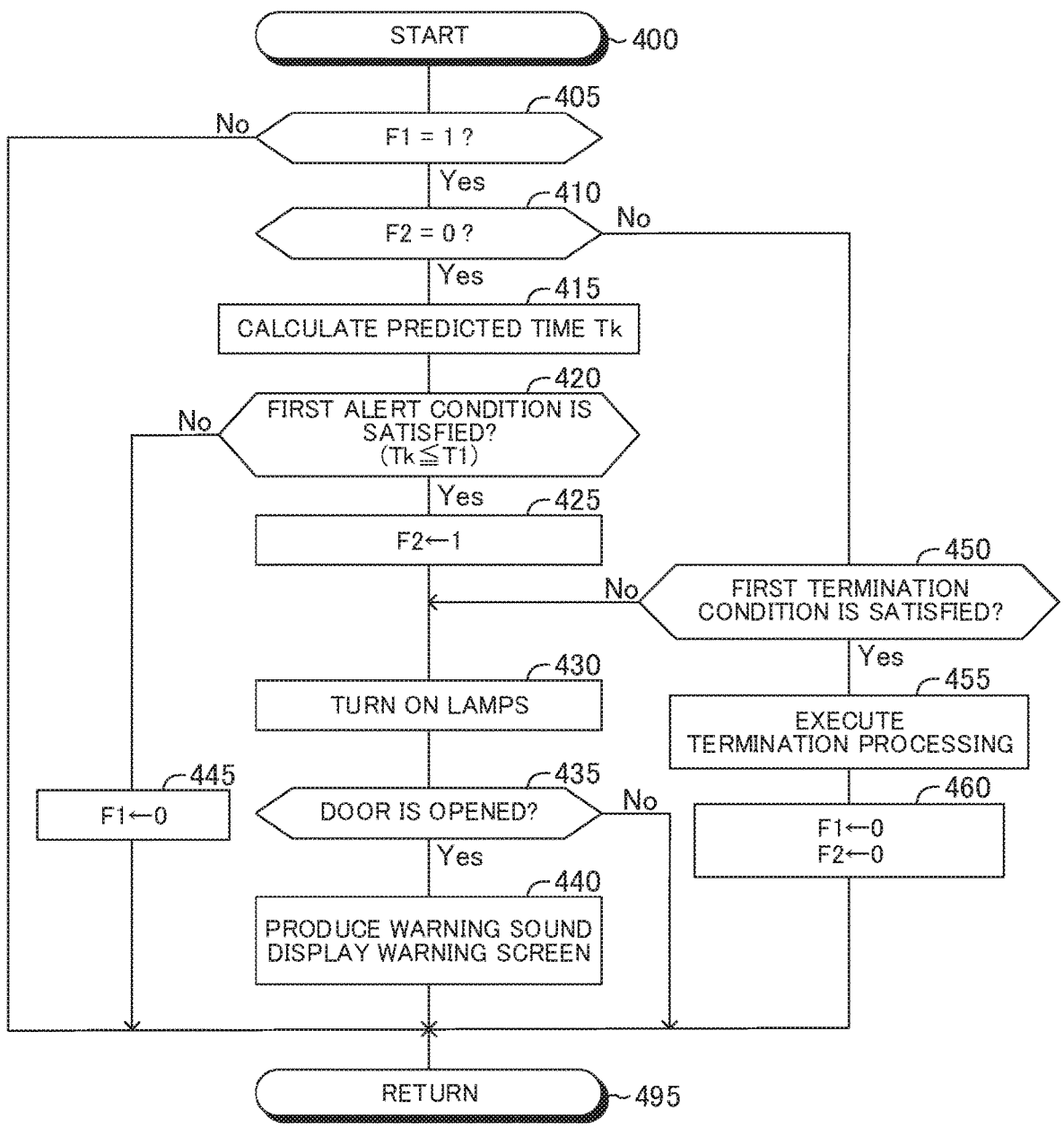
FIG. 4 is a flowchart for illustrating a "first alerting operation routine" to be executed by the CPU of the alert ECU in the embodiment.

Further, the CPU is configured to execute a "first alert routine" illustrated in FIG. 4 every time the second period elapses. When a predetermined timing is reached, the CPU starts the processing from Step 400 of FIG. 4, and proceeds to Step 405 to determine whether or not the value of the first flag F1 is "1". When the value of the first flag F1 is not "1", the CPU makes a "No" determination in Step 405, and proceeds directly to Step 495 to tentatively terminate this routine.

Meanwhile, it is assumed that the value of the first flag F1 is set to "1" in the routine of FIG. 3 (see Step 325). In such a case, the CPU makes a "Yes" determination in Step 405, and proceeds to Step 410 to determine whether or not a value of a second flag F2 is "0". When the value of the second flag F2 is "1", this indicates that the alerting operation is being performed. When the value of the second flag F2 is "0", this indicates that the alerting operation is not being performed.

Assuming that the value of the second flag F1 is "0" (the alerting operation is not being performed), the CPU makes a "Yes" determination in Step 410, and proceeds to Step 415. In Step 415, the CPU calculates the predicted time Tk based on the vehicle peripheral information. In the example of FIG. 6, the CPU calculates the predicted time Tk by dividing a distance La1 in the moving direction of the moving object MO1 between the moving object MO1 and the area As by the speed of the moving object MO1.

Next, in Step 420, the CPU determines whether or not a predetermined first alert condition is satisfied. Specifically, the first alert condition is satisfied when the predicted time Tk calculated in Step 415 is equal to or shorter than the predetermined first time threshold T1. In the present example, the first time threshold T1 is 3 seconds.

When the first alert condition is not satisfied, the CPU makes a "No" determination in Step 420, and proceeds to Step 445 to set the value of the first flag F1 to "0". Then, the CPU proceeds directly to Step 495 to tentatively terminate this routine. In this case, the alerting operation is not performed.

It is now assumed that the predicted time Tk for the moving object MO1 is 2 seconds as illustrated in FIG. 6. In such a case, since the first alert condition is satisfied, the CPU makes a "Yes" determination in Step 420, and executes sequentially the processing of Step 425 and Step 430 described below. Next, the CPU proceeds to Step 435.

(Step 425): The CPU sets the value of the second flag F2 to "1".

(Step 430): The CPU turns on all the lamps 15a to 15d. In this manner, the CPU alerts/notifies all the occupants of the vehicle 10 that the moving object MO1 is approaching the vehicle 10 from the rear of the vehicle 10.

Figure 7:
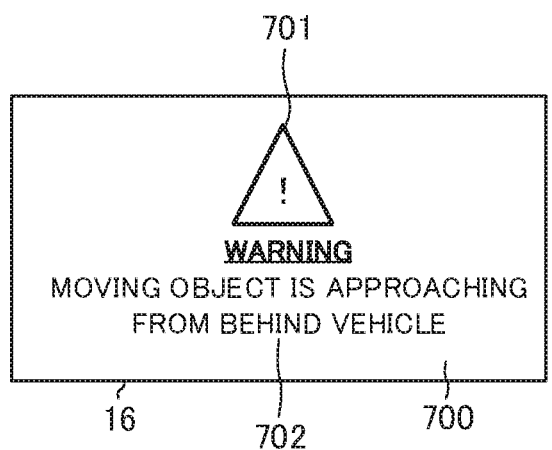
FIG. 7 is a diagram for illustrating a warning screen displayed on a display device in the situation of FIG. 6.

Next, in Step 435, the CPU determines whether or not at least one of the doors 25a to 25d is opened based on the signals from the door switches 14. When at least one of the doors 25a to 25d is opened, the CPU makes a "Yes" determination in Step 435, and proceeds to Step 440. In Step 440, the CPU causes the buzzer 17 to produce a warning sound. Further, as illustrated in FIG. 7, the CPU causes the display device 16 to display a warning screen 700. The warning screen 700 includes a warning sign/mark 701 and a warning message 702. Thereafter, the CPU proceeds to Step 495 to tentatively terminate this routine.

On the other hand, when none of the doors 25a to 25d is open, the CPU makes a "No" determination in Step 435, and proceeds to Step 495 to tentatively terminate this routine.

Figure 8:
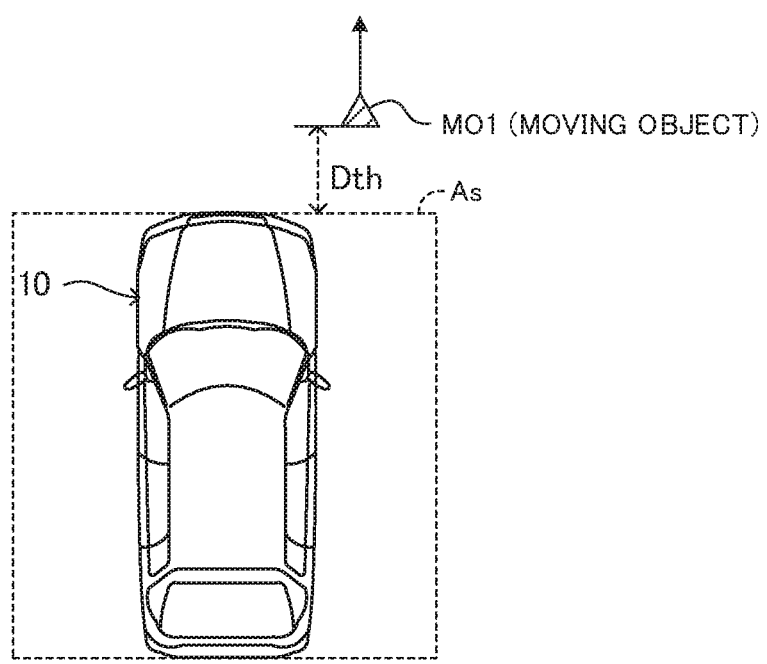
FIG. 8 is a plan view for illustrating a situation after the situation of FIG. 6, in which the moving object has passed by the side of the vehicle and moved to the front of the vehicle.

After the second period has elapsed since the situation illustrated in FIG. 6, the CPU again starts the routine of FIG. 4. When the CPU proceeds to Step 410, since the value of the second flag F2 is "1", the CPU makes a "No" determination, and proceeds to Step 450. In Step 450, the CPU determines whether or not a predetermined first termination condition is satisfied based on the vehicle peripheral information. For example, the first termination condition is satisfied when the moving object MO1 is moving in a direction away from the vehicle 10, and a distance between the area As and the moving object MO1 becomes equal to or longer than a predetermined threshold Dth as illustrated in FIG. 8. When the first termination condition is not satisfied, the CPU makes a "No" determination in Step 450, and executes the processing of Steps 430 to 440 as described above.

On the other hand, when the first termination condition is satisfied, the CPU makes a "Yes" determination in Step 450, and proceeds to Step 455 to execute a predetermined termination processing. Specifically, the CPU turns off the lamps 15a to 15d. Further, in the case where the buzzer is producing the warning sound at the present time, the CPU causes the buzzer 17 to stop the production of the warning sound. In the case where the warning screen 700 is being displayed on the display device 16 at the present time, the CPU clears (hides) the warning screen 700. Next, in Step 460, the CPU sets both the value of the first flag F1 and the value of the second flag F2 to "0". Thereafter, the CPU proceeds to Step 495 to tentatively terminate this routine.

Figure 5:
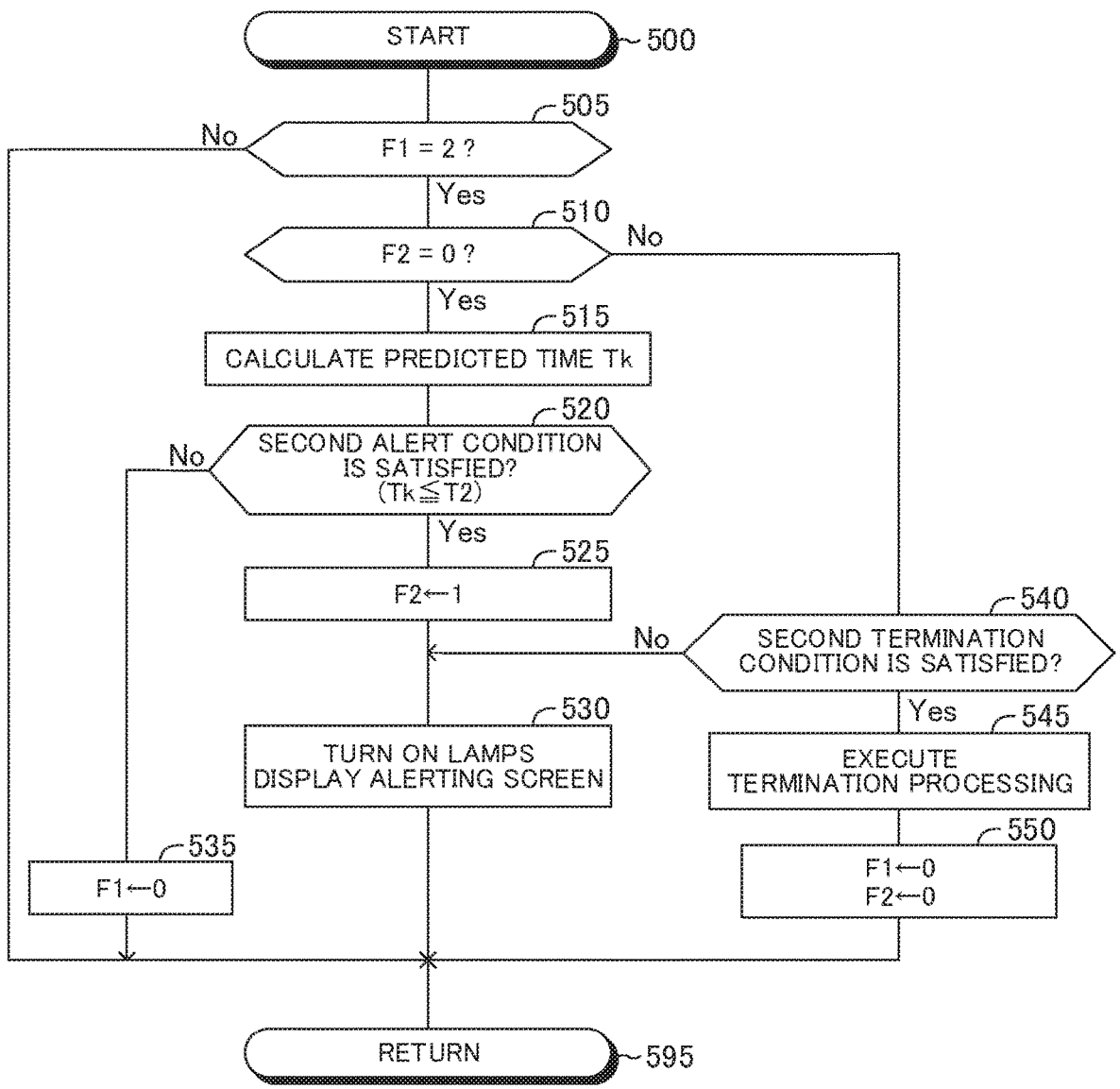
FIG. 5 is a flowchart for illustrating a "second alerting operation routine" to be executed by the CPU of the alert ECU in the embodiment.

Further, the CPU is configured to execute a "second alert routine" illustrated in FIG. 5 every time the second period elapses. When a predetermined timing is reached, the CPU starts the processing from Step 500 of FIG. 5, and proceeds to Step 505 to determine whether or not the value of the first flag F1 is "2". When the value of the first flag F1 is not "2", the CPU makes a "No" determination in Step 505, and proceeds directly to Step 595 to tentatively terminate this routine.

Figure 9:
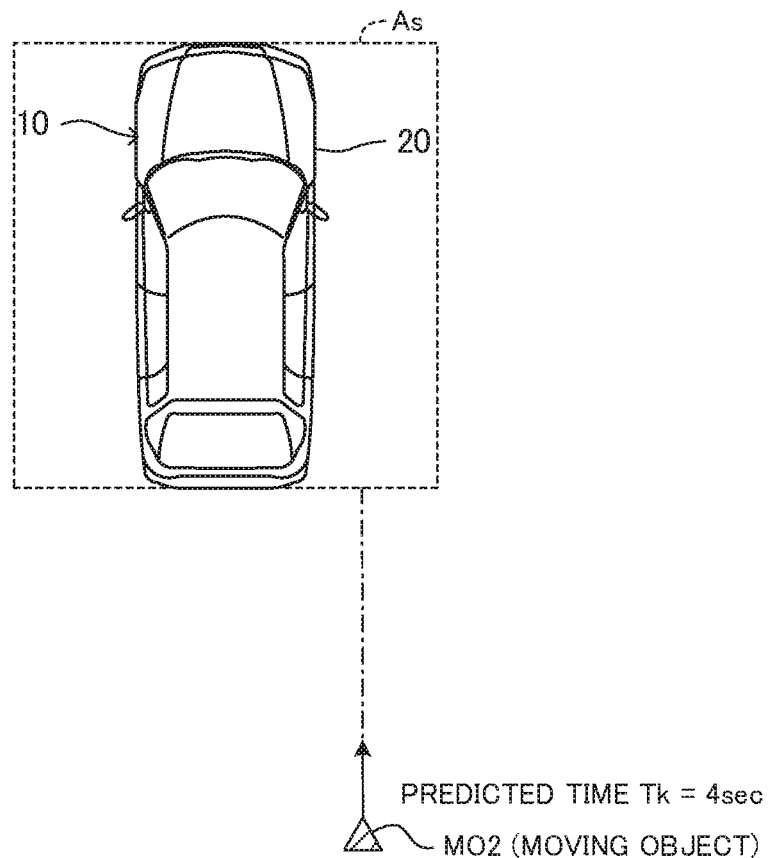
FIG. 9 is a plan view for illustrating a situation in which a moving object is approaching the vehicle from behind the vehicle in a case where the ignition switch is in an off state.

It is now assumed that there is a moving object MO2 which is approaching from the rear of the vehicle 10 as illustrated in FIG. 9. The extended line (dashed-dotted line) of the moving direction of the moving object MO2 intersects with the area As, and the moving speed of the moving object MO2 is greater than the predetermined speed. In such a case, when the CPU executes the routine of FIG. 3, the CPU sets the value of the first flag F1 to "2" (See "Yes" determination in Step 345 and Step 350). Therefore, the CPU makes a "Yes" determination in Step 505, and proceeds to Step 510 to determine whether or not the value of the second flag F2 is "0".

Assuming that the value of the second flag F2 is "0" (the alerting operation is not being performed), the CPU makes a "Yes" determination in Step 510, and proceeds to Step 515. In Step 515, the CPU calculates the predicted time Tk based on the vehicle peripheral information (read in Step 340 in the routine of FIG. 3).

Next, in Step 520, the CPU determines whether or not a predetermined second alert condition is satisfied. Specifically, the second alert condition is satisfied when the predicted time Tk calculated in Step 515 is equal to or shorter than the predetermined second time threshold T2. The second time threshold T2 is longer than the first time threshold T1. In the present example, the second time threshold T2 is 5 seconds. In addition, the above-described predetermined time Tm is a value longer than the second time threshold T2 (T2<Tm).

When the second alert condition is not satisfied, the CPU makes a "No" determination in Step 520, and proceeds to Step 535 to set the value of the first flag F1 to "0". Then, the CPU proceeds directly to Step 595 to tentatively terminate this routine. In this case, the alerting operation is not performed.

In the example of FIG. 9, the predicted time Tk for the moving object MO2 is 4 seconds. In such a case, since the second alert condition is satisfied, the CPU makes a "Yes" determination in Step 520, and executes sequentially the processing of Step 525 and Step 530 described below. Thereafter, the CPU proceeds to Step 595 to tentatively terminate this routine.

(Step 525): The CPU sets the value of the second flag F2 to "1".

Figure 10:
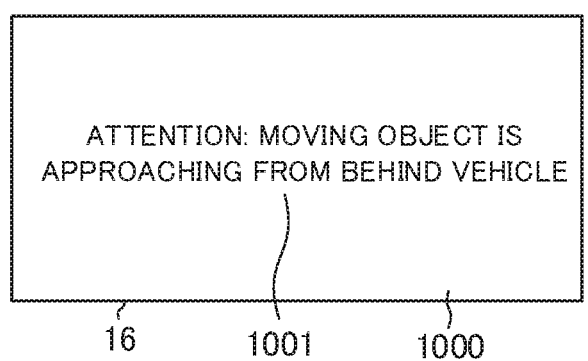
FIG. 10 is a diagram for illustrating an alerting screen displayed on the display device in the situation of FIG. 9.

(Step 530): The CPU turns on all the lamps 15a to 15d. Further, as illustrated in FIG. 10, the CPU causes the display device 16 to display an alerting screen 1000. The alerting screen 1000 includes an alerting message 1001. The alerting screen 1000 does not include the warning sign.

After the second period has elapsed since the situation illustrated in FIG. 9, the CPU again starts the routine of FIG. 5. When the CPU proceeds to Step 510, since the value of the second flag F2 is "1", the CPU makes a "No" determination, and proceeds to Step 540. In Step 540, the CPU determines whether or not a predetermined second termination condition is satisfied. The second termination condition is satisfied when a termination determination time has elapsed since at the time point at which the alerting operation is started (that is, the time point at which the value of the second flag F2 is set to "1"). The termination determination time is a value obtained by adding a predetermined time margin (for example, 5 seconds) to the second time threshold T2. When the second termination condition is not satisfied, the CPU makes a "No" determination in Step 540, and executes the processing of Step 530 as described above.

On the other hand, the second termination condition is satisfied, the CPU makes a "Yes" determination in Step 540, and proceeds to Step 545 to execute a predetermined termination processing. Specifically, the CPU turns off the lamps 15a to 15d, and clears (hides) the alerting screen 1000. Further, the CPU erases (deletes) the vehicle peripheral information from the RAM. Therefore, when the CPU again proceeds to Step 345 in the routine of FIG. 3, the CPU determines that there is no object which is approaching the vehicle 10 from the rear of the vehicle 10 (that is, the moving object condition is not satisfied). The alerting operation is not performed again in the situation in which the IG switch 80 is in the off state. Next, in Step 550, the CPU sets both the value of the first flag F1 and the value of the second flag F2 to "0". Thereafter, the CPU proceeds to Step 595 to tentatively terminate this routine.

In the alert apparatus according to this embodiment described above, the alert ECU 50 and the alert device (including the lamps 15, the display device 16, and the buzzer 17) are connected to the power supply device 60 without interposing the IG switch 80. The alert ECU 50 and the alerting device can operate even in the case where the IG switch 80 is in the off state. In such a configuration, when the IG switch 80 is changed from the on state to the off state, the alert ECU 50 determines whether or not there is a moving object (alert-target object) to be alerted/noted when the occupant gets out of the vehicle, based on the vehicle peripheral information which has been obtained until a time point immediately before the off time point. When the alert ECU 50 determines that there is an alert-target object, the alert ECU 50 causes the alert device to perform the alerting operation as described above. Therefore, even in the case where the IG switch 80 is changed from the on state to the off state, the alert apparatus can alert/notify the occupant that the moving object is approaching the vehicle 10.

Further, in the case where the IG switch 80 is changed from the on state to the off state, the threshold (T2) for the predicted time Tk for determining whether to perform the alerting operation is longer than the threshold (T1) in the case where the IG switch 80 is in the on state. When the IG switch 80 is changed from the on state to the off state, it is considered that the vehicle 10 is parked. In such a situation, it often takes a long time for the occupant to complete getting out of the vehicle 10 after the vehicle 10 is parked. Therefore, the alert apparatus according to this embodiment is configured to consider a moving object as the alert-target to perform the alerting operation even in a situation in which the predicted time Tk is long. According to this configuration, even in the case where the IG switch 80 is in the off state, the safety of the occupant can be ensured/enhanced when he/she gets out of the vehicle.

In addition, in the case where the IG switch 80 is in the on state, the alert apparatus determines whether or not a possibility that the occupant gets out of the vehicle 10 is increased (whether or not at least one of the doors 25a to 25d is opened) after the alerting operation by the lamps 15 is started (Step 430). When determining that the possibility that the occupant gets out of the vehicle 10 is increased, the alert apparatus performs additional alerting operation with high "ability/capability to alert the occupant". Generally, the "ability to alert the occupant" of the warning sound of the buzzer 17 is higher than other alerting operations (lighting of the lamp 15, and display on the display device 16). Therefore, when determining that the possibility that the occupant gets out of the vehicle 10 is increased, the alert apparatus additionally performs the production of the warning sound by the buzzer 17 as the alerting operation. In addition to this, the alert apparatus causes the display device 16 to display the warning screen 700. Since the warning screen 700 includes the warning sign 701, the "ability to alert the occupant" in the warning screen 700 is higher than the screen that does not include such a warning sign (for example, the alerting screen 1000). The alert apparatus can relatively enhance the "ability/function to call attention of the occupant" in the alerting operation in response to the possibility that the occupant gets out of the vehicle 10.

The present disclosure is not limited to the embodiment described above, and various modification examples can be adopted within the scope of the present disclosure.

(Modification 1)

Figure 11:
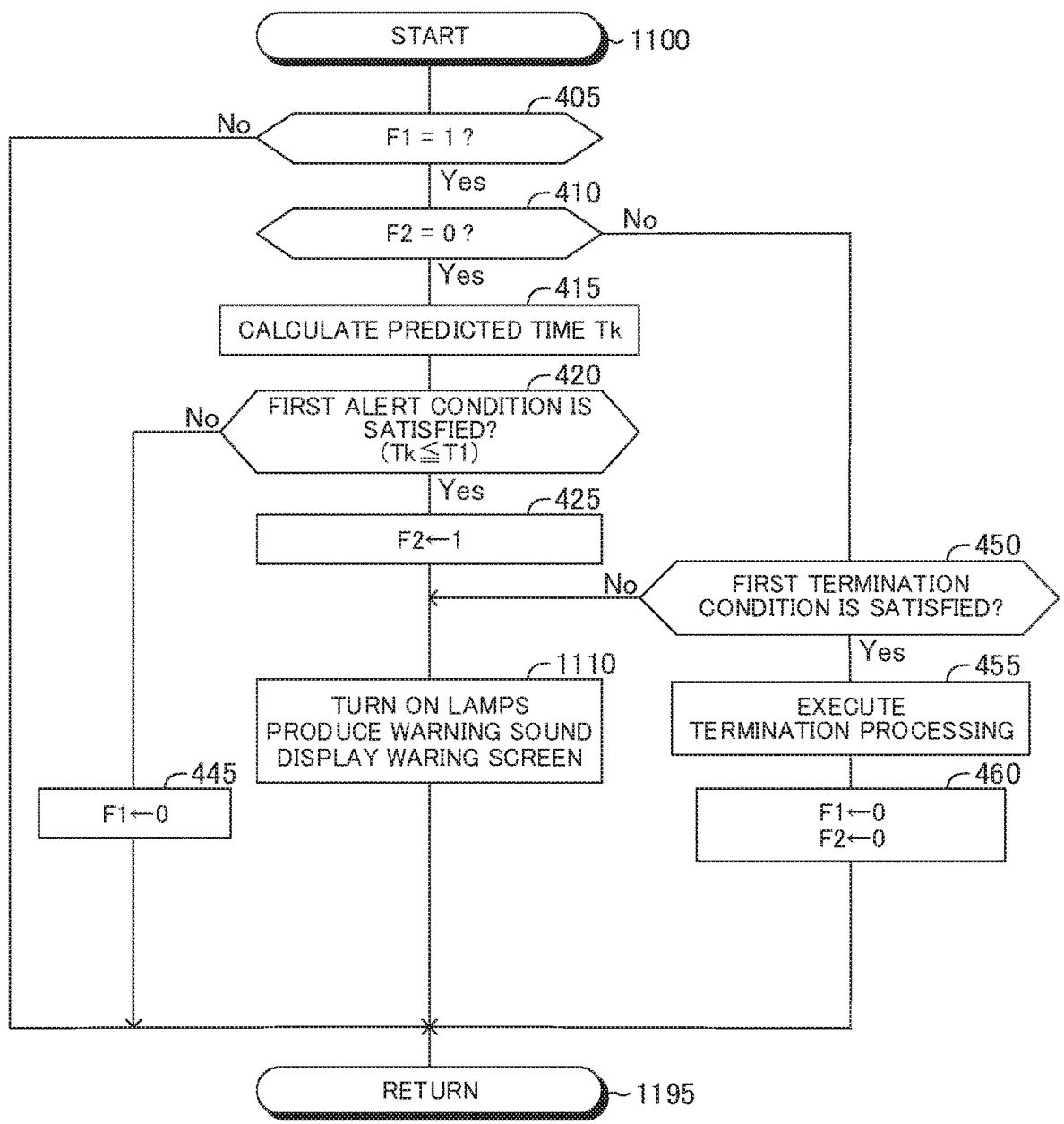
FIG. 11 is a flowchart for illustrating a "first alerting operation routine" to be executed by the CPU of the alert ECU in a modification example.

The CPU may execute a "first alert routine" illustrated in FIG. 11 in place of the routine of FIG. 4. The routine of FIG. 11 is a routine in which Steps 430 to 440 in the routine of FIG. 4 are replaced with Step 1110. Thus, a detailed description is omitted for the steps indicated by the same reference numerals as those of FIG. 4.

When a predetermined timing is reached, the CPU starts the processing from Step 1100 of FIG. 11. When the CPU makes a "Yes" determination in Step 420 and proceeds to Step 1110 through Step 425, the CPU turns on all the lamps 15a to 15d. Further, the CPU causes the buzzer 17 to produce the warning sound, and causes the display device 16 to display the warning screen 700. Thereafter, the CPU proceeds to Step 1195 to tentatively terminate this routine.

According to the present modification, in the case where the IG switch 80 is in the on state, when the CPU determines that an alert-target object is present (that is, the first alert condition is satisfied), the CPU performs the alerting operation by using all of the lamps 15a to 15d, the buzzer 17 and the display device 16. Hereinafter, the alerting operation performed in the case where the IG switch 80 is in the on state is referred to as "first alerting operation".

On the other hand, in the case where the IG switch 80 is in the off state, when the CPU determines that an alert-target object is present (that is, the second alert condition is satisfied), the CPU performs the alerting operation by using the lamps 15a to 15d and the display device 16 (See Step 530 in the routine of FIG. 5). Hereinafter, the alerting operation performed in the case where the IG switch 80 is in the off state is referred to as "second alerting operation".

As described above, the warning sound of the buzzer 17 is an alerting operation with high "ability to alert the occupant". Since the production of the warning sound by the buzzer 17 is not performed in the second alerting operation, the "ability to alert the occupant" in the second alerting operation is lower than the "ability to alert the occupant" in the first alerting operation. Further, the alerting screen 1000 displayed when performing the second alerting operation does not include the warning sign. Therefore, the "ability to alert the occupant" in the alerting screen 1000 is lower than the "ability to alert the occupant" in the warning screen 700 displayed when performing the first alerting operation.

According to the present modification, in the case where the IG switch 80 is in the off state, the CPU performs the alerting operation with the "ability to alert the occupant" lower than that in the case where the IG switch 80 is in the on state. This is due to the following reasons. As described above, in the case where the IG switch 80 is changed from the on state to the off state, even in a situation in which the predicted time Tk is relatively long (a moving object is present at a position relatively far from the vehicle 10), the alerting operation is performed for the occupant. However, after the IG switch 80 is changed to the off state, the moving object (alert-target object) may change its moving direction, and thus, the moving object may not approach the vehicle 10. That is, in the case where the IG switch 80 is in the off state and the predicted time Tk is relatively long, the moving object may not reach the area As. In such a situation, if the alerting operation with high "ability to alert the occupant" is performed, the occupant may feel annoyance. According to the present modification, the "ability to alert the occupant" in the second alerting operation is lower than that in the first alerting operation. Therefore, it is possible to reduce the possibility that the occupant feels annoyance in the case where the IG switch 80 is in the off state.

(Modification 2)

The first alert condition is not limited to the above example. The first alert condition may be a condition satisfied when a relative distance between a moving object and the area As is equal to or shorter than a predetermined first distance threshold D1. In the present modification, the "relative distance" refers to a relative distance in the moving direction of the moving object between the moving object and the area As (or vehicle 10) (see, for example, La1 in FIG. 6). In this configuration, when the relative distance between the moving object and the area As is equal to or shorter than the first distance threshold D1 at a time point at which the CPU proceeds to Step 420, the CPU makes a "Yes" determination, and proceeds to Step 425.

Further, the second alert condition is not limited to the above example. The second alert condition may be a condition satisfied when the relative distance between the moving object and the area As is equal to or shorter than a predetermined second distance threshold D2. The second distance threshold D2 is longer than the first distance threshold D1. In this configuration, when the relative distance between the moving object and the area As is equal to or shorter than the second distance threshold D2 at a time point at which the CPU proceeds to Step 520, the CPU makes a "Yes" determination, and proceeds to Step 525.

(Modification 3)

Figure 12:
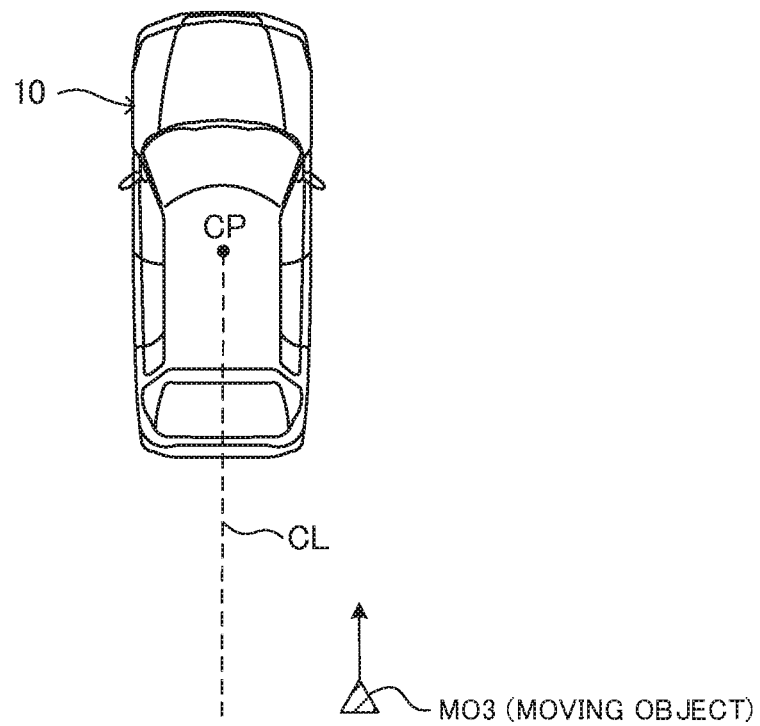
FIG. 12 is a plan view for illustrating a situation in which a moving object is present on a right side with respect to an axis line of the vehicle (line extending in a longitudinal direction of the vehicle from a center position of the vehicle in a vehicle width direction).

In one or both of Step 430 and Step 530, the CPU may selectively turn on the lamps 15a to 15d in response to a position of a moving object. As illustrated in FIG. 12, when a moving object MO3 is present on the right side with respect to an "axis line CL extending in a longitudinal direction of the vehicle from a center position CP of the vehicle 10 in the vehicle width direction", the CPU may turn on the lamps 15a and 15c corresponding to the doors 25a and 25c on the right side of the vehicle 10. On the other hand, when a moving object is present on the left side with respect to the axis line CL, the CPU may turn on the lamps 15b and 15d corresponding to the doors 25b and 25d on the left side of the vehicle 10.

Further, when a moving object is present on the right side with respect to the axis line CL, the CPU may be configured to make a "Yes" determination in Step 435 only when one or both of the doors 25a and 25c on the right side are opened, and proceed to Step 440. When a moving object is present on the left side with respect to the axis line CL, the CPU may be configured to make a "Yes" determination in Step 435 only when one or both of the doors 25b and 25d on the left side are opened, and proceed to Step 440.

(Modification 4)

Figure 13:
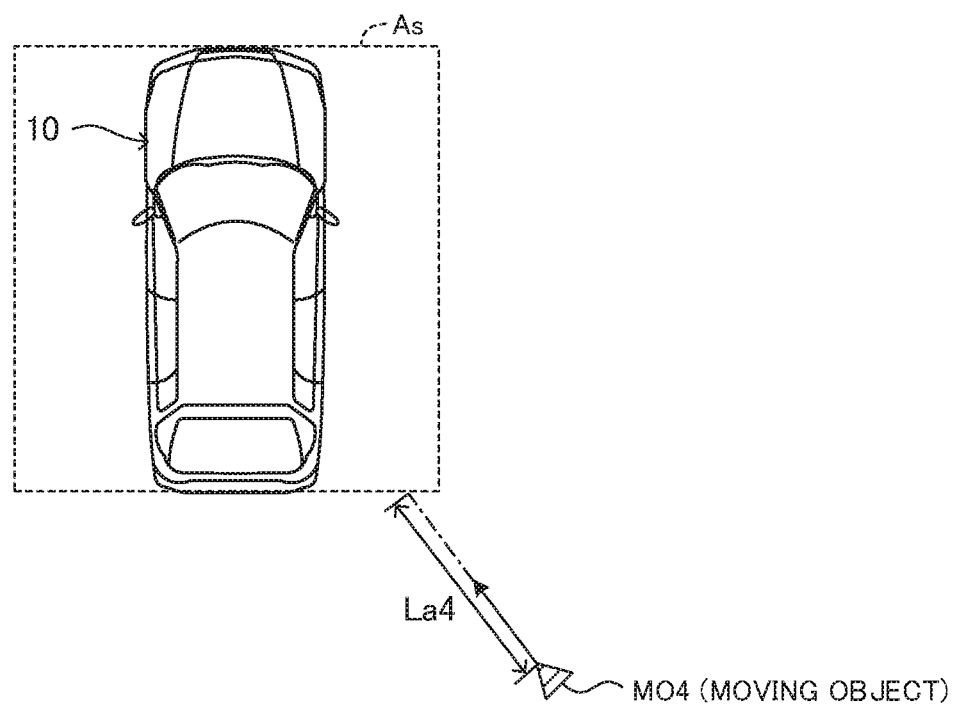
FIG. 13 is a plan view for illustrating a situation in which a moving object is approaching the vehicle from diagonally behind the vehicle (right rear of the vehicle).

As illustrated in FIG. 13, even in a situation in which a moving object is approaching the vehicle 10 from diagonally behind the vehicle 10, the CPU may perform the alerting operation. In the example of FIG. 13, an extended line (dashed-dotted line) of a moving direction of a moving object MO4 intersects with the area As, and a moving speed of the moving object MO4 is higher than the predetermined speed. Therefore, when the CPU proceeds to Step 320 or Step 345 in such a situation, the CPU determines that the moving object condition is satisfied.

In the above situation, the CPU calculates the predicted time Tk by dividing a distance La4 in the moving direction of the moving object MO4 between the moving object MO4 and the area As by the speed of the moving object MO4. In this manner, the CPU can determine whether or not the first alerting condition (Step 420) or the second alerting condition (Step 520) is satisfied.

(Modification 5)

Figure 14:
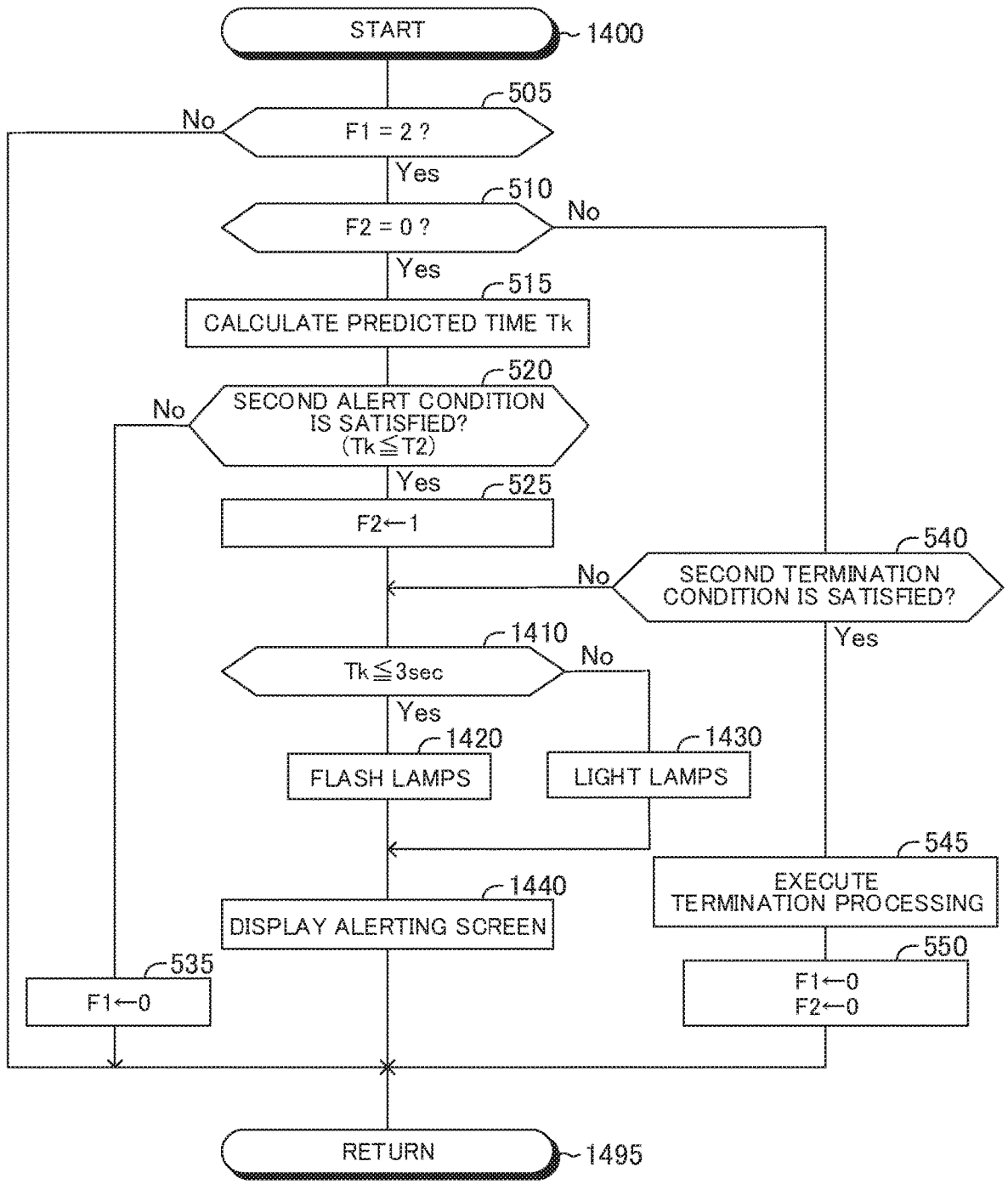
FIG. 14 is a flowchart for illustrating a "second alerting operation routine" to be executed by the CPU of the alert ECU in a modification example.

The CPU may execute a "routine" illustrated in FIG. 14 in place of the routine of FIG. 5. The routine of FIG. 14 is a routine in which Step 530 in the routine of FIG. 5 is replaced with Steps 1410 to 1440. Thus, a detailed description is omitted for the steps indicated by the same reference numerals as those of FIG. 5.

When the CPU starts the processing from Step 1400 of FIG. 14 and proceeds to Step 1410, the CPU determines whether or not the predicted time Tk is equal to or shorter than 3 seconds. When the predicted time Tk is equal to or shorter than 3 seconds, the CPU makes a "Yes" determination in Step 1410, and proceeds to Step 1420. In Step 1420, the CPU flashes (blinks) the lamps 15a to 15d. Next, in Step 1440, the CPU causes the display device 16 to display the alerting screen 1000. Thereafter, the CPU proceeds to Step 1495 to tentatively terminate this routine.

On the other hand, when the predicted time Tk is longer than 3 seconds, the CPU makes a "No" determination in Step 1410, and proceeds to Step 1430. In Step 1430, the CPU lights the lamps 15*a* to 15*d* (that is, the lamps 15*a* to 15*d* are simply lighted up). Next, in Step 1440, the CPU causes the display device 16 to display the alerting screen 1000. Thereafter, the CPU proceeds to Step 1495 to tentatively terminate this routine.

Regarding the lamps, the "ability to alert the occupant" in the blinking operation (Step 1420) is higher than that in the simply-lighting-up operation (Step 1430). According to the present modification, in the case where a moving object is expected to reach the area As in a relatively short time since the off time point (the predicted time Tk is 3 seconds or shorter), the ability to alert the occupant can be relatively enhanced.

(Modification 6)

The alerting operation may be performed when the vehicle 10 is traveling at a low speed. In this configuration, the CPU may make a "Yes" determination in Step 310 when the vehicle speed of the vehicle 10 is equal to or lower than a predetermined low speed threshold (>0), and then, proceed to Step 315.

(Modification 7)

The alerting operation is not limited to the example described above. The CPU may cause a speaker (not shown) to utter a message indicating that a moving object is approaching the vehicle.

What is claimed is:

1. An alert apparatus for a vehicle, comprising:
a power supply device mounted in the vehicle;
a switch, a connection state of the switch being changed from an off state to an on state when a driver of the vehicle drives the vehicle, and being changed from the on state to the off state when the driver stops driving the vehicle;
an information acquisition device connected to the power supply device via the switch, wherein the information acquisition device is supplied with electric power from the power supply device when the connection state of the switch is the on state, the information acquisition device being configured to acquire vehicle peripheral information including information on a moving object which is present at least behind the vehicle through use of the supplied electric power;
a memory that stores the vehicle peripheral information acquired while the connection state of the switch is the on state;
an alerting device configured to be supplied with the electric power from the power supply device regardless of whether the connection state of the switch is the on state or the off state, the alerting device being further configured to perform an alerting operation for alerting an occupant of the vehicle through use of the supplied electric power; and
a controller configured to be supplied with the electric power from the power supply device regardless of whether the connection state of the switch is the on state or the off state, the controller being programmed to:
during a period of time when the connection state of the switch is the off state, determine whether or not there is an alert-target object based on the vehicle peripheral information that was stored in the memory while the connection state of the switch was the on state, the alert-target object being a moving object to be alerted when the occupant gets out of the vehicle;
calculate a predicted time until the moving object reaches a predetermined area defined on the basis of the vehicle; and
determine that the moving object is the alert-target object based on the predicted time,
cause the alerting device to perform the alerting operation when (i) the connection state of the switch is the on state and (ii) the predicted time is equal to or shorter than a predetermined first time threshold; and
cause the alerting device to perform the alerting operation when (i) the connection state of the switch is the off state and (ii) the predicted time is equal to or shorter than a predetermined second time threshold, wherein the predetermined second time threshold is longer than the predetermined first time threshold.

2. An alert apparatus for a vehicle, comprising:
a power supply device mounted in the vehicle;
a switch, a connection state of the switch being changed from an off state to an on state when a driver of the vehicle drives the vehicle, and being changed from the on state to the off state when the driver stops driving the vehicle;
an information acquisition device connected to the power supply device via the switch, wherein the information acquisition device is supplied with electric power from the power supply device when the connection state of the switch is the on state, the information acquisition device being configured to acquire vehicle peripheral information including information on a moving object which is present at least behind the vehicle through use of the supplied electric power;
a memory that stores the vehicle peripheral information acquired while the connection state of the switch is the on state;
an alerting device configured to be supplied with the electric power from the power supply device regardless of whether the connection state of the switch is the on state or the off state, the alerting device being further configured to perform an alerting operation for alerting an occupant of the vehicle through use of the supplied electric power, and
a controller configured to be supplied with the electric power from the power supply device regardless of whether the connection state of the switch is the on state or the off state, the controller being programmed to:
during a period of time when the connection state of the switch is the off state, determine whether or not there is an alert-target object based on the vehicle peripheral information that was stored in the memory while the connection state of the switch was the on state, the alert-target object being a moving object to be alerted when the occupant gets out of the vehicle;
calculate a relative distance between the moving object and a predetermined area defined on the basis of the vehicle; and
determine that the moving object is the alert-target object based on the relative distance,
cause the alerting device to perform the alerting operation when (i) the connection state of the switch is the on state and (ii) the relative distance is equal to or shorter than a predetermined first distance threshold; and
cause the alerting device to perform the alerting operation when (i) the connection state of the switch is the off state and (ii) the relative distance is equal to or shorter than a predetermined second distance threshold, wherein the predetermined second distance threshold is longer than the predetermined first distance threshold.

3. The alert apparatus according to claim 1,
wherein the alert device includes a lighting device, a display device, and a sound production device,
wherein the controller is further programmed to:
when determining that there is the alert-target object in the case where the connection state of the switch is the on state, cause the alert device to perform a first alerting operation as the alerting operation; and
when determining that there is the alert-target object in the case where the connection state of the switch is the off state, cause the alert device to perform a second alerting operation as the alerting operation,
wherein the first alerting operation includes lighting of the lighting device, displaying on the display device, and sounding of the sound production device, and the second alerting operation includes lighting of the lighting device and displaying of the display device without sounding of the sound production device.

4. The alert apparatus according to claim 2,
wherein the alert device includes a lighting device, a display device, and a sound production device,
wherein the controller is further programmed to:
when determining that there is the alert-target object in the case where the connection state of the switch is the on state, cause the alert device to perform a first alerting operation as the alerting operation; and
when determining that there is the alert-target object in the case where the connection state of the switch is the off state, cause the alert device to perform a second alerting operation as the alerting operation,
wherein the first alerting operation includes lighting of the lighting device, displaying on the display device, and sounding of the sound production device, and the second alerting operation includes lighting of the lighting device and displaying of the display device, without sounding of the sound production device.

5. An alert apparatus for a vehicle, comprising:
a power supply device including a battery and an alternator, mounted in a vehicle, configured to supply electric power,
a switch, a connection state of the switch being changed from an off state to an on state when a driver of the vehicle drives the vehicle, and being changed from the on state to the off state when the driver stops driving the vehicle;
a vehicle peripheral sensor, including at least one of: a radar sensor, an ultrasonic sensor, or a camera, connected to the power supply device via the switch and supplied with electric power from the power supply device when the connection state of the switch is the on state, the vehicle peripheral sensor configured to acquire vehicle peripheral information including information on a moving object which is present at least behind the vehicle through use of the supplied electric power;
a memory that stores the vehicle peripheral information acquired while the connection state of the switch is the on state;
an alerting device, including at least one of: a lighting device, a display device or a sound production device, that is supplied with the electric power from the power supply device regardless of whether the connection state of the switch is the on state or the off state, the alerting device being further configured to perform an alerting operation for alerting a vehicle occupant through use of the supplied electric power; and
at least one electronic control unit (ECU) including a processor programmed to:
in a case where the connection state of the switch is the off state, and the ECU is supplied with electric power from the power supply device, read the vehicle peripheral information that was stored in the memory while the connection state of the switch was the on state, and determine whether or not an alert-target object is present based on the vehicle peripheral information that was read from the memory,
wherein the alert-target object is a moving object to be alerted to the vehicle occupant when the vehicle occupant gets out of the vehicle;
calculate a predicted time until the moving object reaches a predetermined area defined on the basis of the vehicle; and
determine that the moving object is the alert-target object based on the predicted time,
cause the alerting device to perform the alerting operation when (i) the connection state of the switch is the on state and (ii) the predicted time is equal to or shorter than a predetermined first time threshold; and
cause the alerting device to perform the alerting operation when (i) the connection state of the switch is the off state and (ii) the predicted time is equal to or shorter than a predetermined second time threshold, wherein the predetermined second time threshold is longer than the predetermined first time threshold.

* * * * *